United States Patent [19]
Aske

[11] 4,144,765
[45] Mar. 20, 1979

[54] LINEAR ACCELEROMETER WITH TORSION HINGE SUSPENSION

[75] Inventor: Vernon H. Aske, Hopkins, Minn.

[73] Assignee: Honeywell Inc., Minneapolis, Minn.

[21] Appl. No.: 835,274

[22] Filed: Sep. 21, 1977

[51] Int. Cl.² ............................................. G01P 15/08
[52] U.S. Cl. .................................. 73/517 B; 267/154; 267/162
[58] Field of Search ...................... 73/514, 515, 516 R, 73/517 B; 267/158, 160–163, 154

[56] References Cited
U.S. PATENT DOCUMENTS

| 3,120,130 | 2/1964 | Cohen | 73/517 B |
| 3,239,804 | 3/1966 | Elskamp et al. | 267/161 X |
| 3,536,315 | 10/1970 | Jenkin | 267/160 X |

Primary Examiner—James J. Gill
Attorney, Agent, or Firm—Charles L. Rubow; Henry L. Hanson

[57] ABSTRACT

Linear acceleration responsive apparatus is disclosed wherein a sensing mass is suspended within a housing by torsion hinge means located along a pair of parallel axes in each of two planes perpendicular to an input axis. Separate torsion hinge means in each plane are attached to the mass and the housing by ring assemblies, and are joined by intermediate arms which may serve as flex leads for carrying electric current to a force rebalance winding on the mass.

18 Claims, 7 Drawing Figures

LINEAR ACCELEROMETER WITH TORSION HINGE SUSPENSION

BACKGROUND OF THE INVENTION

The present invention relates generally to acceleration responsive devices, and more specifically to an improved torsion hinge suspension system for achieving exceptional stability and sensitivity in linear accelerometers.

Acceleration responsive devices perform essential sensing functions in a wide variety of systems. As performance requirements and available technology have advanced, the demand has increased for sensors characterized by much improved sensitivity, stability, reliability and ruggedness, in addition to fast reaction time and low cost. Implicit in the stability and sensitivity requirements is a requirement that precision be maintained over a wide temperature range. The present state of the art is such that it has been difficult to achieve improvements in all of the foregoing characteristics simultaneously, or, in some instances, even to achieve improvement in one characteristic without adversely affecting another. Nevertheless, requirements exist, particularly in aircraft navigation and missile guidance systems, for a single acceleration sensor with superior performance in all of the noted areas.

Performance of prior linear accelerometers has been limited to at least some extent by the apparatus for suspending the sensing mass within its housing. A large number of suspension apparatus variations have been devised and are presently employed. They are based on such diverse concept implementations as magnetics, electrostatics, hydrostatics, hydrodynamics, squeeze films, flexure members, torsion members and pivot and jewel supports, as well as floatation and floatation with augmentation.

Certain of these concept implementations are effectively eliminated from consideration for use in an acceleration sensor which meets the above noted requirements. For example, floatation suspension systems require temperature control which inherently results in slow reaction time and high cost. Electrostatic and hydrostatic suspension systems, which are relatively sophisticated, are also prohibitively expensive for many applications.

In addition, one of the most important parameters in assessing an accelerometer suspension system is its ratio of restraint transverse to the input axis to restraint along the input axis. None of the non-mechanical linear suspension systems have been found to provide as high a ratio of cross-axis to input axis restraint as the better mechanical flexure systems. Torsion member systems are attractive because the shear modulus for most materials is much less than (approximately one third) the Young's modulus which applies to flexure systems. However, most prior torsion member systems cannot provide adequate suspension stiffness transverse to the input axis. Also, conventional suspension systems employing torsion members frequently provide pendulous constraint of the sensing mass.

One relatively common form of the flexure suspension system includes one or more diaphragms of which portions have been removed to provide compliance along the input axis. Such suspension systems are shown in U.S. Pat. No. 2,643,869 issued to J. Clark on June 30, 1953, 2,767,973 issued to L. ter Veen et al on Oct. 23, 1956, Re. 27,532 issued to H. Morris on Dec. 12, 1972 and 3,224,245 issued to J. Alibrandi et al on Dec. 21, 1965. It has been found that such designs, if made sufficiently compliant along the input axis, do not achieve the cross-axis stiffness required for many applications. They do, however, provide the advantage of basically linear constraint of the sensing mass.

In addition to a high ratio of cross-axis to input-axis restraint, low absolute input-axis restraint is important for the following reasons. Precision over a wide temperature range dictates minimum changes in null bias and scale factor with changes in temperature. Null bias is dependent on both elastic restraint along the input axis and displacement between the mechanical null position of the suspension system and electrical null position of the pickoff system. Stability of the null bias is predominantly the result of a stable relationship between the mechanical and electrical null positions. Lack of stability can result from physical movement of the suspension null or the pickoff null, or electrical changes in the pickoff or its associated circuitry. In any event, movement of the nulls with respect to one another changes the null bias. Change in null bias in a pendulous accelerometer is usually also accompanied by a change in alignment of motion of the sensing mass relative to the input axis. These problems may be minimized by reducing restraint along the input axis, providing a stable and linear (non-pendulous) suspension system, and by providing a stable pickoff system.

The applicant has devised a unique quadra-hinge suspension system which employs torsion members in a manner that achieves exceptionally high cross-axis restraint, concurrent with exceptional compliance along the input axis. This unique suspension system realizes a ratio of cross-axis to input-axis restraint in the order of one million to one, which is considerably higher than heretofore achieved. The quadra-hinge implementation also results in substantially linear motion of the sensing mass, thereby minimizing the likelihood of misalignment of sensing mass motion relative to the input axis. Further, the quadra-hinge design achieves minimum cross coupling of sensing mass motions along separate axes.

The applicant's quadra-hinge suspension system is designed such that portions thereof may form portions of a unique variable capacitor position pickoff system. This commonality results in an exceptionally stable null bias. The suspension system may also perform the functions of flex leads and damping means. Finally, the principal elements of the suspension system may be formed as integral units by chemical etching, so as to achieve low cost and accurate duplication. In accordance with the above-described features, the applicant's unique suspension system design has been found to avoid many of the disadvantages associated with known prior art linear accelerometer suspension systems.

SUMMARY OF THE INVENTION

A linear accelerometer suspension system in accordance with the present invention basically comprises first, second, third and fourth torsion hinge means respectively located along first, second, third and fourth parallel hinge axes perpendicular to the accelerometer input axis. The first and second axes and the third and fourth axes respectively lie in parallel planes, with the first and third torsion hinge means attached to a sensing mass in the accelerometer, and the second and fourth torsion hinge means attached to the accelerometer housing. The first and third torsion hinge means and the second and fourth torsion hinge means are joined by intermediate arms, whereby the mass is substantially constrained from movement transverse to the input axis. The intermediate arms and torsion members joined thereto are also designed so that they may be employed as flex leads to carry electrical signals to a force rebalance winding on the sensing mass and/or portions of a position pickoff means.

The primary object of this invention is to provide a linear accelerometer employing a suspension system suitable for achieving superior accelerometer performance.

It is a further object of this invention to provide a unique linear accelerometer torsion suspension system which achieves an exceptionally high ratio of cross-axis to input-axis restraint.

A further object is to provide a high precision, stable, low cost linear accelerometer.

A further object is to provide a linear accelerometer design in which the suspension system is fabricated of a minimum number of simple, economical and reproducible parts.

Yet a further object is to provide a linear accelerometer in which the suspension system is also capable of serving as flex lead means for carrying signals to a force rebalance winding on the mass and/or portions of a position pickoff.

Additional objects of the invention may be ascertained from a study of the disclosure, drawings and appended claims.

DESCRIPTION OF THE PREFERRED EMBODIMENT

Figure 1:
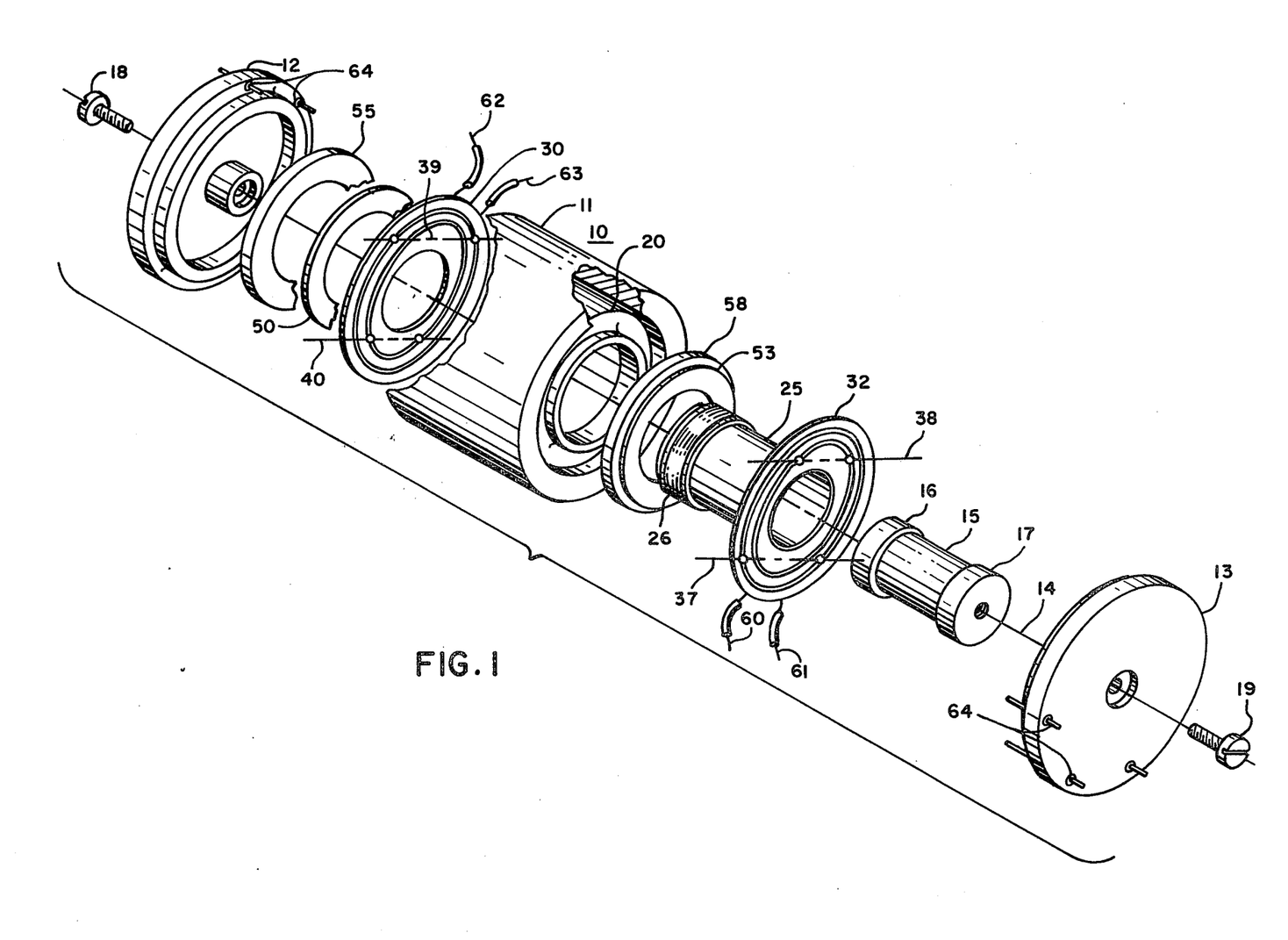
FIG. 1 is an exploded view of a first linear accelerometer embodiment employing a quadra-hinge torsion suspension system of a first design in accordance with the applicant's invention.
Figure 2:
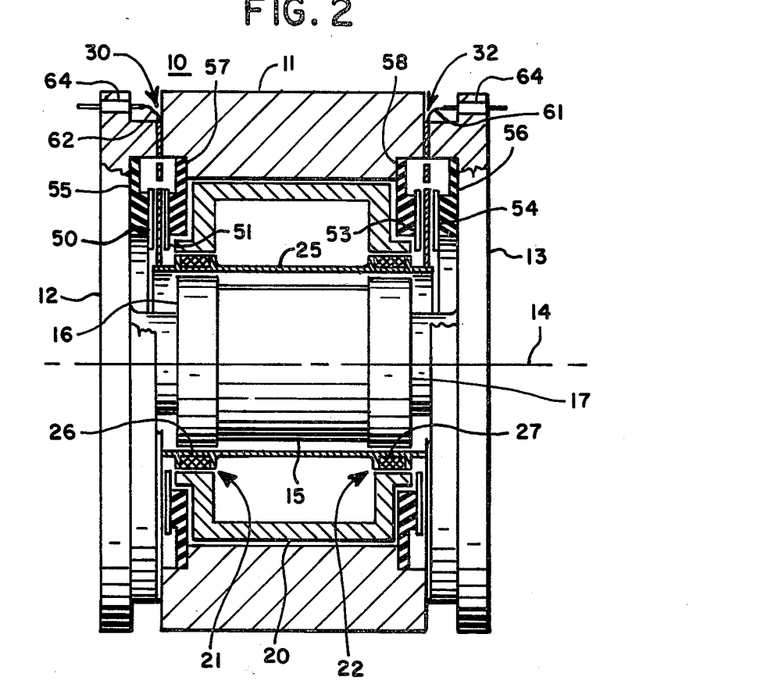
FIG. 2 is an assembled cross-sectional view of the accelerometer shown in FIG. 1.

In FIGS. 1 and 2, reference numeral 10 generally identifies a first embodiment of a linear accelerometer employing unique quadra-hinge torsion suspension means in accordance with the present invention. Accelerometer 10 includes a housing comprising a basically tubular center section 11 and a pair of end caps 12 and 13. End caps 12 and 13 are attached to center section 11 by suitable fasteners (not shown), such as a plurality of bolts or screws extending through each end cap around its periphery and into an end wall of the center section. The housing is aligned with an input axis 14 along which accelerometer 10 is sensitive to acceleration.

A cylindrical permanent magnet 15 is contained within the housing, and is fitted with a pair of pole pieces 16 and 17. Magnet 15 and pole pieces 16 and 17 are fixed in a central position within the housing by means of screws or bolts 18 and 19 extending through end caps 12 and 13 respectively. An annular magnetic flux return path structure 20 of magnetically permeable material is fitted within center housing section 11 around permanent magnet 15 and pole pieces 16 and 17 so as to provide a pair of annular gaps 21 and 22 in the magnetic circuit. Gaps 21 and 22 comprise a pair of series gaps in the magnetic circuit, with magnetic flux lines directed radially outward through one of the gaps and radially inward through the other gap.

An acceleration sensing bobbin or mass 25 of tubular form is positioned between the magnet-pole piece assembly 15–17 and magnetic return path structure 20. First and second circumferential windings 26 and 27 are carried on mass 25 in the areas within gaps 21 and 22 respectively. Windings 26 and 27 in cooperation with the magnetic circuit comprise portions of a force rebalance system for normally maintaining mass 25 at a predetermined location along input axis 14. The force rebalance system comprises the subject matter of and is fully described in U.S. patent application Ser. No. 835,273 for a Linear Accelerometer with Improved Magnetic Rebalance Systems filed concurrently herewith in the name of the same applicant and assigned to the same assignee as the present application. For reasons set forth in U.S. Pat. No. 3,152,275 issued Oct. 6, 1964 to the same applicant and assigned to the same assignee as the present application, the dimensions of windings 26 and 27 parallel to axis 14 are slightly less than the corresponding dimensions of pole pieces 16 and 17 and adjacent portions of return path structure 20.

Mass 25 is mechanically suspended within the housing of accelerometer 10 by means of a pair of planar disk-shaped suspension assemblies generally identified by reference numerals 30 and 32. The suspension assemblies can best be described with reference to FIGS. 3–5 which show assembly 32 as typical. Suspension assembly 32 is a laminate structure having two identical outer layers of laminae 33 and 34 and an inner pair of symmetrical coplanar laminae 35 and 36. Layer 33 comprises three concentric generally circular rings 33a, 33b and 33c. Layer 34 comprises three concentric generally circular rings 34a, 34b and 34c. Lamina 35 comprises an outer flange 35a, an intermediate arm 35b and an inner flange 35c. Intermediate arm 35b is joined to flange 35a by a torsion member 35d, and to flange 35c by a torsion member 35e. Similarly, lamina 36 comprises an outer flange 36a, an intermediate arm 36b and an inner flange 36c. Intermediate arm 36b is joined to flange 36a by a torsion member 36d, and to flange 36c by a torsion member 36e.

Figure 3:
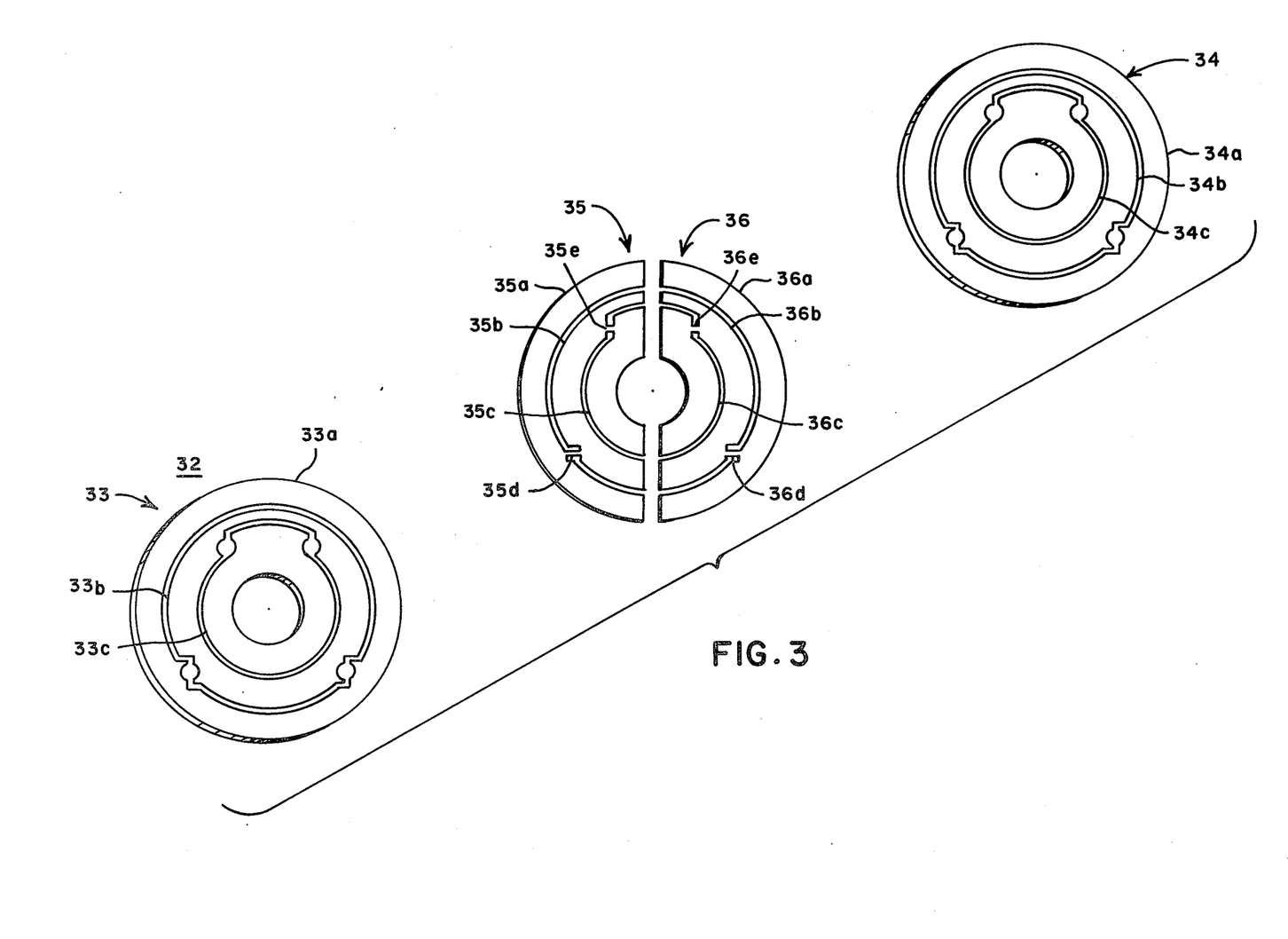
FIG. 3 is an exploded view of a quadra-hinge assembly of the type used in the accelerometer of FIGS. 1 and 2.
Figure 4:
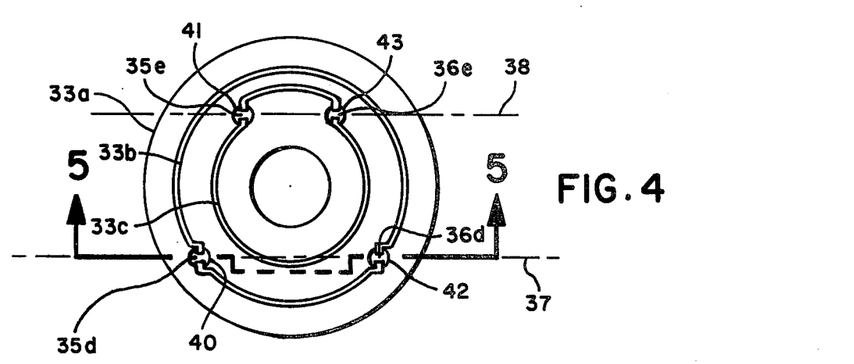
FIG. 4 is a plan view of the quadra-hinge assembly of FIG. 3.
Figure 5:
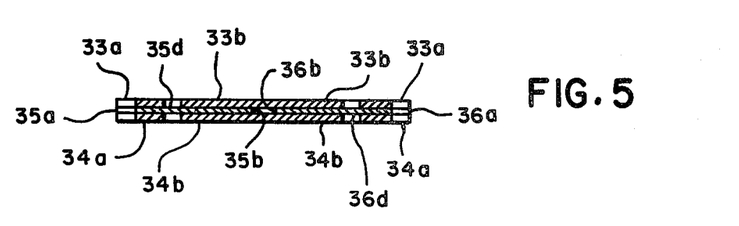
FIG. 5 is a cross-sectional view of the quadra-hinge assembly of FIGS. 3 and 4 taken along line 5—5 in FIG. 4.

Inner laminae 35 and 36 together have a size and general configuration similar to layers 33 and 34, and may be considered as three concentric generally circular split rings 35a–36a, 35b–36b and 35c–36c. However, unlike in layers 33 and 34, outer flange means or ring 35a–36a is joined to intermediate arm means or ring 35b–36b through torsion hinge means comprising members 35d and 36d. Similarly, inner flange means or ring 35c–36c is joined to intermediate arm means 35b–36b through torsion hinge means comprising members 35e and 36e.

Inner laminae 35 and 36 are sandwiched between outer layers 33 and 34. For reasons which will hereinafter be described in greater detail, layers 33 and 34 and laminae 35 and 36 are preferrably bonded together by means of a nonconductive material so as to electrically insulate the various elements in the suspension assembly. As is apparent from FIGS. 3 and 4, the suspension assembly design shown therein employs intermediate arm means having a substantially uniform radial cross section between the points at which it is joined to the inner and outer flange means or rings. Torsion hinge means 35d–36d and 35e–36e are respectively located along parallel hinge axes 37 and 38.

As can best be seen in FIG. 4, when suspension assembly 32 is fabricated, torsion members 35d, 35e, 36d and 36e are aligned with apertures 40, 41, 42 and 43 formed by enlarged areas in slits between the several rings in each of outer layers 33 and 34. Accordingly, layers 33 and 34 serve to stiffen all of laminae 35 and 36 except for torsion members 35d, 35e, 36d and 36e. A suspension assembly as shown in FIGS. 3–5 has been found to provide exceptional restraint in the plane of the assembly. Conversely, such a suspension assembly has been found very compliant along an axis perpendicular to the plane of the assembly.

As previously indicated, a pair of suspension assemblies 30 and 32 are employed to position mass 25 within the housing of accelerometer 10. A central hole in each of the assemblies is sized to slip over the outer ends of mass 25. The inner rings of the suspension assemblies are rigidly attached to the ends of the mass by any suitable means, such as a bead of epoxy cement at the interface between each assembly and the mass. The outer ring of suspension assembly 30 is rigidly clamped between end cap 12 and center section 11 of the housing. Similarly, the outer ring of suspension assembly 32 is rigidly clamped between end cap 13 and section 11. For reasons which will hereinafter be apparent, fastening of the outer rings to the housing is accomplised in such a manner that the inner laminae of the suspension assemblies are electrically insulated from the housing.

With accelerometer 10 assembled, hinge axes 37 and 38 lie in a plane perpendicular to input axis 14. Further axes 37 and 38 are equidistant from axis 14 on opposite sides thereof. Suspension assembly 30 has associated therewith hinge axes 39 and 40 which correspond to axes 37 and 38 respectively. Axes 39 and 40 lie in a plane parallel to axes 37 and 38. However, suspension assembly 30 is rotated 180° about axis 14 relative to suspension assembly 32. Accordingly, the torsion hinge means joining the inner ring and intermediate arm means of suspension assembly 30 is on the opposite side of axis 14 from the torsion hinge means joining the inner ring and intermediate arm means of suspension assembly 32. This relationship results in cancellation of moments about the hinge axes caused by accelerations transverse to input axis 14.

The inner ring of each of suspension assemblies 30 and 32 may be utilized as a moveable plate of variable capacitance pickoff means for producing a signal indicative of the position of mass 25 relative to the accelerometer housing. Each of the moveable plates is positioned between a pair of fixed capacitor plates mounted on the housing. Specifically, the moveable plate of assembly 30 is positioned between fixed plates 50 and 51. The moveable plate of assembly 32 is positioned betwen fixed plates 53 and 54. Fixed plates 50 and 54 are mounted on insulating rings 55 and 56 in end caps 12 and 13 respectively. Fixed plates 51 and 53 are mounted on insulating rings 57 and 58 at opposite ends center housing section 11. This arrangement effectively provides four variable capacitors, one between each side of each moveable plate and the adjacent fixed plate. The variable capacitors may be connected to form a bridge circuit for detecting movement of mass 25 with a high degree of sensitivity. Signals produced by the bridge circuit may be used as input signals to rebalance circuitry (not shown) for controlling the current in windings 26 and 27 so as to maintain mass 25 at a predetermined location within the accelerometer housing. Such a capacitance bridge and current control circuitry are described in detail in previously identified concurrently filed patent application.

Laminae 35 and 36 of suspension assembly 32 may be used to carry signals to the moveable capacitor plates of suspension assemblies 30 and 32. Similarly, corresponding laminae of suspension assembly 30 may be used to carry current to windings 26 and 27. As previously indicated, laminae 35 and 36 and corresponding laminae in assembly 30 are electrically insulated from each other and from the outer layers of laminae on the suspension assemblies, and are suitable for serving as four flex leads. Specifically, a signal supplied to lamina 35 travels through outer flange 35a, torsion member 35d, intermediate arm 35b, torsion member 35e and inner flange 35c. A signal supplied to lamina 36 travels through outer flange 36a, torsion member 36d, intermediate arm 36b, torsion member 36e and inner flange 36c. Identical electrical paths can be traced through suspension assembly 30.

As shown in FIGS. 1 and 2, accelerometer 10 is adapted to accommodate signal pickoff and force rebalance circuitry (not shown) on the exterior of end caps 12 and 13. Jumper leads 60 and 61 are shown for completing external electrical connections to outer flanges 35a and 36a respectively. Jumper leads 62 and 63 are shown for completing external electrical connections to corresponding outer flanges of suspension assembly 30. Electrical feedthrough devices 64 are provided in the end caps for carrying signals between the signal pickoff and force rebalance circuitry and leads 60–63. An annular channel around each end of the accelerometer housing adjacent the ends of central section 11 provides access for completing the electrical connections following structural assembly of the accelerometer.

Figure 6:
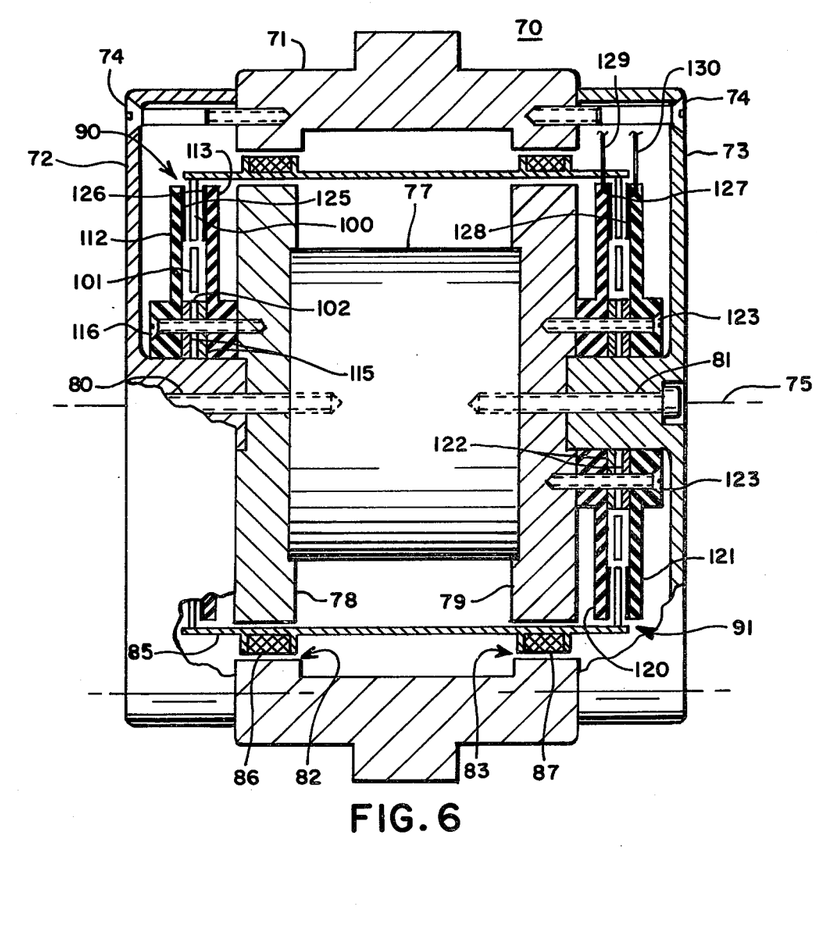
FIG. 6 is a cross-sectional view of a linear accelerometer embodiment employing a quadra-hinge suspension system of a second design in accordance with the applicant's invention.

Referring to FIG. 6, reference numeral 70 generally identifies a second embodiment of a linear accelerometer which is conceptually and functionally similar to accelerometer 10. The principal distinguishing feature of accelerometer 70 resides in utilization of suspension assemblies which are configured differently than suspension assemblies 30 and 32.

Accelerometer 70 includes a housing having an tubular center section 71 which also serves as a magnetic flux return path for a magnetic circuit in the accelerometer. End caps 72 and 73 are attached to opposite ends of center section 71 by means of a plurality of screws 74 extending through each end cap around its periphery and into an end wall of the center section. The housing is aligned with an input axis 75 along which accelerometer 79 is sensitive to acceleration.

A cylindrical permanent magnet 77 is contained within the housing, and is fitted with a pair of pole pieces 78 and 79. Magnet 77 and pole pieces 78 and 79 are fixed in a central position within the housing by means of screws or bolts 80 and 81 extending through end caps 72 and 73 respectively. Magnet 77, pole pieces 78 and 79 and surrounding housing 71 are arranged to provide a pair of annular gaps 82 and 83 comprising series gaps in the magnetic circuit, with magnetic flux lines directed radially outward through one of the gaps and radially inward through the other gap.

An acceleration sensing bobbin or mass 85 similar to bobbin or mass 25 is suspended between the magnet-pole piece assembly 77–79 and housing section 71. First and second circumferential windings 86 and 87 are carried on mass 25 in the regions within gaps 82 and 83 respectively. Windings 86 and 87 in cooperation with the magnetic circuit comprise portions of a force rebalance system for normally maintaining mass 85 at a predetermined location along input axis 75. As indicated in the description of the accelerometer embodiment of FIGS. 1–5, the force rebalance system comprises the subject matter of the previously identified copending patent application. The relative geometries of gaps 82 and 83 and windings 86 and 87 are discussed in previously identified U.S. Pat. No. 3,152,275.

Figure 7:
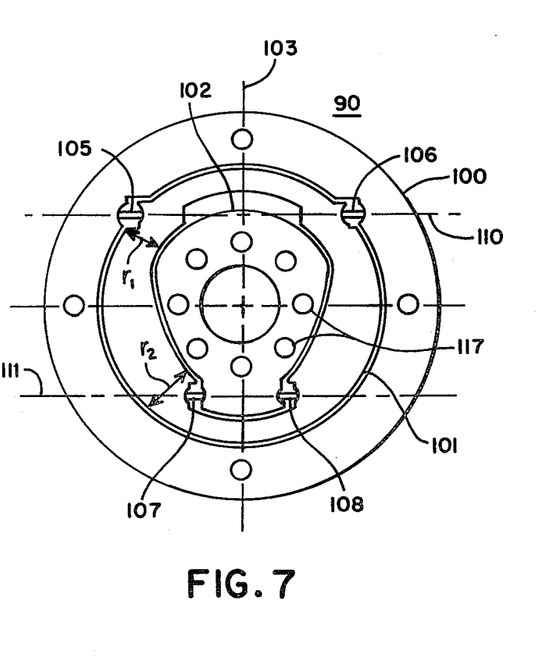
FIG. 7 is a plan view of the quadra-hinge assembly used in the accelerometer of FIG. 6.

Mass 85 is suspended by means of a pair of identical planar disc shaped suspension assemblies generally identified by reference numerals 90 and 91. Suspension assembly 90 is shown in greater detail in FIG. 7, and is functionally similar to suspension assemblies 30 and 32. It comprises three layers of which the two outer layers are identical. As seen in FIG. 7, the outer layers each comprise three generally concentric coplanar rings, including an outer ring 100, an intermediate ring 101 and an inner ring 102. As described for suspension assemblies 30 and 32, the inner layer of suspension assembly 90 comprises two separated symmetrical sections lying on opposite sides of axis 103 in FIG. 7. Except for the gap between the sections and torsion members which will hereinafter be discussed, the inner and outer layers of suspension assembly 90 are substantially identically configured in planes perpendicular to axis 75.

Each half of the inner layer of suspension assembly 90 comprises a generally semicircular outer flange, an arcuate intermediate arm and a generally semicircular inner flange. The intermediate arms of the inner layer are joined to the outer and inner flanges through torsion members 105–106 and 107–108 respectively. Each of the layers of suspension assembly 90 is formed from sheet material by a suitable process, such as chemical etching. Accordingly, the intermediate arm, outer and inner flanges and interconnecting torsion members forming each half of the inner layer of suspension assembly 90 comprise a unitary structure.

As described for suspension assemblies 30 and 32, the layers in each of suspension assemblies 90 and 91 are preferably bonded together by means of a nonconductive adhesive so as to electrically insulate the various elements in the assemblies. The torsion hinge means comprising torsion members 105 and 106 is aligned with a hinge axis 110. The torsion hinge means comprising torsion members 107 and 108 is aligned with a hinge axis 111 which is parallel with hinge axis 110. As can be seen in FIG. 7, suspension assemblies 90 and 91 are configured such that the intermediate arms vary in radial dimension from a minimum dimension $r_1$ adjacent the points at which they are joined to the outer flanges to a maximum dimension $r_2$ adjacent the points at which they are joined to the inner flanges.

In the accelerometer embodiment shown in FIG. 6, the outer rings of suspension assemblies 90 and 91 are sized to fit inside the ends of mass 85, and are rigidly attached to the mass. Attachment may be accomplished by means of a bead of epoxy cement at the interface between each assembly and the mass, or by other suitable means. The inner ring of assembly 90 is maintained in a fixed position relative to the accelerometer housing by means of a pair of insulating support discs 112 and 113, a pair of spacers 115 and a pluarlity of screws 116. As shown, the inner ring assembly 90 is clamped in place with one of the insulating discs and spacers on each side thereof by means of screws extending through the discs, spacers and holes 117 in the suspension assembly, and into pole piece 78. The inner ring suspension assembly 91 is similarly clamped in place between a pair of insulating discs 120 and 121, and a pair of spacers 122 by means of a plurality of screws 123.

As described in connection with the accelerometer embodiment of FIGS. 1–5, each of the intermediate arms of the inner layer of the suspension assemblies is adapted to serve as a flex lead for carrying electrical signals between moving and stationary portions of the accelerometer. Two of the flex leads, such as those formed by the intermediate arms in assembly 90 may be used to carry current to windings 86 and 87 on mass 85. The remaining intermediate arms may be used to carry electrical signals to outer ring 100 and the corresponding outer ring of assembly 91 which may be utilized as moveable plates of variable capacitance pickoff means for producing a signal indicative of the position of mass 25 relative to the accelerometer housing.

The moveable plate formed by ring 100 is positioned between a pair of fixed capacitor plates 125 and 126 carried on insulating discs 112 and 113 respectively. Identical fixed capacitor plates 127 and 128 are positioned adjacent opposite sides of the outer ring of suspension assembly 91 by means of insulating discs 120 and 121 respectively. Conductors 129 and 130 are shown for carrying electrical signals to fixed capacitor plates 127 and 128. Similar conductors (not shown) are provided for carrying electrical signals to capacitor plates 125 and 126. Capacitor plates 125–128 may be formed in any suitable manner, such as by metallization of appropriate portions of the surfaces of insulating discs 112, 113, 120 and 121. As previously indicated, this arrangement effectively provides four variable capacitors which may be connected to form a bridge circuit for detecting movement of mass 85 with a high degree of sensitivity. Signals produced by the bridge circuit may be used as input signals to rebalance circuitry (not shown) for controlling the current in windings 86 and 87.

Both of the previously described embodiments of the applicant's linear accelerometer have been found to provide exceedingly high ratios of cross-axis to input-axis constraint of the sensing mass. However, the embodiment of FIGS. 6 and 7 is believed to have some superior characteristics where the ultimate in cross-axis to input-axis restraint is required. At least theoretically, this design results in increased radial or cross-axis stiffness. Further, it minimizes the diameter and mass of the intermediate arms, thereby minimizing their effect on accelerometer dynamics.

Although two embodiments of the applicant's linear accelerometer employing unique assemblies for suspending the sensing mass within the accelerometer housing have been shown and described for illustrative purposes, other embodiments which do not depart from the teachings herein will be apparent to those skilled in the art. It is not intended that coverage be limited to the disclosed embodiments, but only by the terms of the appended claims.

The embodiments of the invention in which an exclusive property or right is claimed are defined as follows:

1. An accelerometer comprising:
   a housing having an input axis fixed relative thereto;
   a mass located within said housing for sensing acceleration along the input axis;
   first and second torsion hinge means respectively located along first and second parallel hinge axes fixed relative to said mass and perpendicular to the input axis, each of said first and second torsion hinge means comprising first and second torsion members spaced along the hinge axis associated therewith;
   third and fourth torsion hinge means respectively located along third and fourth hinge axes fixed relative to said housing and parallel to the first and second hinge axes, each of said third and fourth torsion hinge means comprising first and second torsion members spaced along the hinge axis associated therewith;
   a first intermediate arm joining the first torsion members of said first and third torsion hinge means;
   a second intermediate arm joining the second torsion members of said first third torsion hinge means; and
   a third intermediate arm joining the first torsion members of said second and fourth torsion hinge means;
   a fourth intermediate arm joining the second torsion members of said second and fourth torsion hinge means; and
   force rebalance means for maintaining said mass at a substantially fixed location along the input axis.

2. The accelerometer of claim 1 wherein the pair of torsion members joined by each intermediate arm comprise integral appendages of the intermediate arm.

3. The accelerometer of claim 2 wherein:
   the first and third hinge axes lie in a first plane substantially perpendicular to the input axis, and on opposite sides thereof;
   the second and fourth hinge axes lie in a second plane parallel with the first plane, and on opposite sides of the input axis; and
   the first, second, third and fourth hinge axes are equidistant from the input axis.

4. The accelerometer of claim 3 wherein the first and second hinge axes are on opposite sides of the input axis.

5. The accelerometer of claim 2 wherein:
   said force rebalance means includes an electrically conductive winding on said mass; and
   said first and second intermediate arms and torsion members joined thereto are electrically conductive and connected to said winding to permit carrying of electric current thereto.

6. The accelerometer of claim 5 wherein;
   the torsion members of said first and second torsion hinge means are respectively attached to said mass by first and second flange means integrally formed with the torsion members and rigidly attached to said mass;
   the torsion members of said third and fourth torsion hinge means are respectively attached to said housing by third and fourth flange means integrally formed with the torsion members and rigidly attached to said housing;
   said first and third flange means, said first and third torsion hinge means and said first intermediate arm means comprise coplanar laminae in a first suspension assembly in which said first and third flange means and said first intermediate arm means have stiffening laminae bonded thereto; and
   said second and fourth flange means, said second and fourth torsion hinge means and said second intermediate arm means comprise coplanar laminae in a second suspension assembly in which said second and fourth flange means and said second intermediate arm means have stiffening laminae bonded thereto.

7. The accelerometer of claim 6 wherein said first and second suspension assemblies are each configured as:
   a generally circular inner ring attached to said mass;
   a generally circular outer ring attached to said housing; and
   arcuate intermediate arm means interposed between said inner and outer rings.

8. The accelerometer of claim 6 wherein said first and second suspension assemblies are each configured as:
   an outer ring attached to said mass;
   an inner ring attached to said housing; and
   arcuate intermediate arm means interposed between said outer and inner rings.

9. The accelerometer of claim 8 wherein said arcuate intermediate arm means is configured to have radial dimensions which vary from a minimum dimension adjacent said first and second torsion hinge means to a maximum dimension adjacent said third and fourth torsion hinge means.

10. In linear acceleration responsive apparatus wherein a mass is suspended within a housing so as to permit movement relative to the housing along an input axis, the mass being normally maintained in a fixed position relative to the housing by force rebalance means, and any movement of the mass relative to the housing being indicated by pickoff means, an improved suspension system comprising:
    first and second torsion hinge means located along first and second parallel hinge axes, each hinge means including first and second torsion members spaced apart along a hinge axis;
    first intermediate arm means joining said first and second torsion hinge means, said first intermediate arm means including a first intermediate arm joining the first torsion members and a second intermediate arm joining the second torsion members;
    third and fourth torsion hinge means located along third and fourth parallel hinge axes, each hinge means including first and second torsion members spaced apart along a hinge axis;
    second intermediate arm means joining said third and fourth torsion hinge means, said second intermediate arm means including a first intermediate arm joining the first torsion members and a second intermediate arm joining the second torsion members;
    first connecting means for rigidly attaching said first torsion hinge means to said housing so that the first and second hinge axes lie in a first plane perpendicular to the input axis and on opposite sides thereof;
    second connecting means for rigidly attaching said second torsion hinge means to said mass;
    third connecting means for rigidly attaching said third torsion hinge means to said housing so that the third and fourth hinge axes are parallel to the first and second hinge axes, and lie in a second plane perpendicular to the input axis and on opposite sides thereof; and fourth connecting means for rigidly attaching said fourth torsion hinge means to said mass, whereby said mass is substantially constrained from movement transverse to the input axis.

11. The acceleration responsive apparatus of claim 10 wherein the first and third hinge axes are located on opposite sides of the input axis.

12. The acceleration responsive apparatus of claim 11 wherein:
said first, second, third and fourth connecting means comprise first, second, third and fourth flange means integrally formed with said first, second, third and fourth torsion hinge means respectively;
said first and second torsion hinge means, said first intermediate arm means and said first and second flange means are configured as a symmetrical pair of unitary coplanar laminae in a first suspension assembly;
said first intermediate arm means and said first and second flange means are stiffened with additional laminae;
said third and fourth torsion hinge means, said second intermediate arm means and said third and fourth flange means are configured as a symmetrical pair of unitary coplanar laminae in a second suspension assembly; and
said second intermediate arm means and said third and fourth flange means are stiffened with additional laminae.

13. The acceleration responsive apparatus of claim 12 wherein said first and second suspension assemblies each have a planar disc-shaped configuration comprising:
an inner ring;
an outer ring; and
arcuate intermediate arm means joined to said inner and outer rings through torsion members.

14. The acceleration responsive apparatus of claim 13 wherein said inner and outer rings are attached to said mass and said housing respectively.

15. The acceleration responsive apparatus of claim 13 wherein said intermediate arm means has a substantially uniform cross section between the points at which it is joined to said inner and outer rings.

16. The acceleration responsive apparatus of claim 13 wherein said inner and outer rings are attached to said housing and said mass respectively.

17. The acceleration responsive apparatus of claim 13 wherein said intermediate arm means is configured to have a radial dimension with reference to the input axis which varies from a minimum dimension adjacent the points at which it is joined to said outer ring to a maximum dimension adjacent the points at which it is joined to said inner ring.

18. The acceleration responsive apparatus of claim 12 wherein:
said pair coplanar laminae in each of said first and second suspension assemblies are electrically insulated from said additional laminae;
said force rebalance means includes a winding on said mass; and
said first and second torsion hinge means; said first intermediate arm means and said first and second flange means provide for carrying electric current to said winding.

* * * * *